(12) United States Patent
Feistmantl (10) Patent No.: US 7,300,522 B2
(45) Date of Patent: Nov. 27, 2007

(54) MOBILE CLEANING AND WASHING PLANT FOR SHOPPING TROLLEYS

(75) Inventor: Manfred Feistmantl, Innsbruck (AT)

(73) Assignee: Friedl Invest GmbH, Widnau (CH)

( * ) Notice: Subject to any disclaimer, the term of this patent is extended or adjusted under 35 U.S.C. 154(b) by 265 days.

(21) Appl. No.: 10/479,784

(22) PCT Filed: Jun. 18, 2002

(86) PCT No.: PCT/EP02/06729

§ 371 (c)(1),
(2), (4) Date: Nov. 25, 2003

(87) PCT Pub. No.: WO03/002391

PCT Pub. Date: Jan. 9, 2003

(65) Prior Publication Data

US 2004/0159336 A1   Aug. 19, 2004

(30) Foreign Application Priority Data

Jun. 28, 2001   (DE) ................................ 101 31 398

(51) Int. Cl.
*B08B 3/02* (2006.01)
(52) U.S. Cl. .................. 134/18; 134/25.1; 134/32; 134/72; 134/124
(58) Field of Classification Search ............... 134/18, 134/25.1, 26, 32, 57 R, 72, 124
See application file for complete search history.

(56) References Cited

U.S. PATENT DOCUMENTS

| | | | | |
|---|---|---|---|---|
| 3,444,867 A | * | 5/1969 | Thornton | ............ 134/123 |
| 3,698,029 A | | 10/1972 | Pulliam | |
| 4,377,227 A | * | 3/1983 | Sandford | ............ 194/211 |
| 4,561,904 A | * | 12/1985 | Eberhardt, Jr. | ............ 134/18 |
| 4,807,319 A | * | 2/1989 | Poitevin | ............ 15/88.3 |
| 5,993,739 A | | 11/1999 | Lyon | |
| 6,090,218 A | * | 7/2000 | Brackmann et al. | .......... 134/15 |
| 6,427,707 B1 | * | 8/2002 | Morris | ............ 134/72 |

FOREIGN PATENT DOCUMENTS

FR   2 774 051 A3   7/1999

OTHER PUBLICATIONS

International Search Report for PCT/EP/06729 (which corresponds to present application).

* cited by examiner

*Primary Examiner*—Joseph L. Perrin
(74) *Attorney, Agent, or Firm*—The H. T. Than Law Group (57) ABSTRACT

A mobile cleaning plant for cleaning shopping trolleys and similar transport systems includes a container configured to receive the shopping trolleys in hoxizontally stacked rows. The shopping trolleys are fed into an inlet on the container via a device, automatically pushed through the container on a conveyor system, and exit the container through an outlet positioned near the inlet. The conveyor system includes two tracks which run along the longitudinal axis of the container and are connected to each other via a third track which runs perpendicular to the longitudinal axis of the container. As the inlet and outlet are positioned in proximity to one another, or are the same orifice, the mobile cleaning plant does not require decoupling from a hauling device, such as a truck, prior to operation.

19 Claims, 4 Drawing Sheets

MOBILE CLEANING AND WASHING PLANT FOR SHOPPING TROLLEYS

BACKGROUND AND FIELD OF THE INVENTION

The present invention relates in general to the field of the process technology of cleaning plants, and in particular to mobile cleaning systems for shopping trolleys consisting of a plurality of cleaning stations, a new circulatory type of arrangement of the individual stations being used in order to obtain processing advantages and therefore increased economic efficiency of the entire cleaning system.

The term "shopping trolleys" as used below refers to transport containers which today are principally used in large shops, grocery stores and supermarkets in order to facilitate for customers the transportation of goods selected in the store to the cash till and optionally the transportation of the goods purchased at the till to a transport vehicle parked in front of the store. Because of their frequent use and as a result of residues of products left behind as refuse in the trolleys, said trolleys become soiled within a short time so that it is necessary for hygienic and health reasons to subject used shopping trolleys to thorough cleaning at regular intervals in order to meet food hygiene regulations.

The invention relates equally to the cleaning of comparable transport devices such as boxes, crates and other containers.

Whereas earlier shopping trolleys had to be scrubbed and washed manually using chemical cleaning agents, fully automatic cleaning plants, which carry out the cleaning process considerably more efficiently and therefore represent a major facilitation, are increasingly used today. In addition, when using fully automatic cleaning plants, a large proportion of the cleaning personnel employed at the store can be saved.

Because the shopping trolleys of different stores which are to be cleaned are located at different sites and must be cleaned on site, it is necessary that the automatic cleaning plant can be transported to the place of use.

Conventional mobile cleaning and washing plants for shopping trolleys of all kinds generally comprise at least one cleaning station, a water treatment plant having pumps, valves, filters, pipework, containers and/or measuring instruments, a control unit, a housing in which the components listed are installed and a transport device on which the housing is mounted.

According to the prior art, various solutions to the problem of the automatic cleaning of trolleys are available, each of these solutions being optimised for a particular application. Certain limitations are therefore associated with each of these solutions. To explain in general terms some of the most important of these solutions, it is necessary to refer briefly to their most important aspects.

The invention proposed in German Patent DE 198 57 915 A1 relates to a mobile cleaning and washing plant for shopping trolleys of all kinds in which a washing box together with a cleaning fluid or water treatment plant and connecting pipes is mounted on a base frame which in turn is attached to a transport device. To clean the shopping trolleys, the mobile cleaning and washing plant, when at the desired place of use, is either placed on the supports of the base frame in front of the transport device, or remains on the transport device during the cleaning operation.

In the German Utility Model Application DE 298 12 683 U1, a mobile washing container is disclosed which can be used in particular for cleaning shopping trolleys, mesh boxes and merchandise baskets. This mobile washing container is a standard Eurocontainer. After the residual waste has been conveyed into a collecting tray by means of a suction fan, the transport containers to be cleaned are moved through a washing installation which includes high-pressure jets, movable and adjustable washing brushes, disinfectant jets, a drying-air duct and an oil spray device for spraying the wheels and wheel pivots of the transport containers to be cleaned. Spraying of the transport containers to be cleaned with a disinfectant by means of disinfectant jets specially provided for this purpose ensures additional hygiene. A recirculated water cleaning arrangement which carries out a water treatment process is also integrated in the mobile washing container. Because it has an independent power supply, this washing container can be used everywhere without being dependent on external power supply arrangements.

German Utility Model Application DE 299 01 282 U1 relates to a washing system for shopping trolleys which is equipped with its own power supply unit. This can be preferably a diesel unit which generates electric current in order to operate the electrical, pneumatic and hydraulic components contained in the washing system disclosed. The washing system also includes a purification component which purifies the used cleaning fluid so that said fluid needs to be changed less frequently. In addition, a blast air drying system is integrated to dry the shopping trolleys after washing. The washing system also includes components which lubricate the wheels and wheel axles.

German Patent Application DE 38 28 035 C2 discloses a machine which can be placed directly on the ground for cleaning serving trolleys, aircraft catering trolleys, kitchen trolleys or suchlike transport vehicles for groceries in which the vehicles are fed to the cleaning machine manually via a ramp, then automatically opened, pre-washed and washed, rinsed, dried and removed again manually via a ramp. The cleaning machine comprises successively arranged stations for pre-washing, washing, rinsing and drying the trolleys to be cleaned. Inside the cleaning machine the trolleys are moved through the machine at least between the zones responsible for the washing and drying processes by conveyor means installed in the floor of the cleaning machine. The underlying solution of this patent application is also distinguished by the fact that one or more collecting tanks for receiving cleaning fluid via a suction nozzle and an additional pump are connected to an intermediate tank which in turn is connected via a pressure pump for feeding and/or circulating the cleaning fluid to spraying nozzles which are mounted in both the washing and the rinsing zones.

A mobile cleaning plant for shopping trolleys is disclosed in U.S. Pat. No. 4,807,319. In this system, the shopping trolleys are pushed into the cleaning plant on a long side of the container, transported through the washing installation inside the container by means of a conveyor belt parallel to the longitudinal axis of the container and finally are removed from the container in the cleaned state on the opposite side.

Known from DE 199 36 906 is a cleaning plant for "small containers" in which the objects to be cleaned are conveyed along substantially vertical paths during their passage through the washing installation.

OBJECT OF THE INVENTION

It is an object of the present invention to provide a mobile cleaning plant for transport containers, in particular for shopping trolleys, which mobile cleaning plant can be economically and easily manufactured and permits feeding of the goods to be cleaned to and/or from the installation plant in a favourable manner with regard to process technology.

This object is achieved by the features of the independent claims. Advantageous embodiments are defined in the dependent claims.

SUMMARISING DESCRIPTION OF THE INVENTION

The basic invention discloses a mobile cleaning and washing plant for transport containers which can be economically and easily manufactured and which achieves the object defined in the previous paragraph.

Using this mobile cleaning plant, in particular shopping trolleys, which are fed in horizontally stacked rows to the mobile cleaning plant and removed therefrom after cleaning, can be efficiently and quickly cleaned. It is provided that the shopping trolleys to be cleaned, which are fed to the mobile cleaning plant in horizontally stacked rows, are automatically separated, and that the cleaned shopping trolleys, which are removed from the mobile cleaning plant again in rows, can be automatically stacked. The mobile cleaning plant is therefore suited to cleaning approx. 2000 shopping trolleys per day in a completely independent operation.

Because the washing installation of the mobile cleaning plant according to the invention has a U-shaped configuration, the intake and outlet of the washing installation are located at the same end of the mobile cleaning plant. The resulting advantage for processing is that the cleaned shopping trolleys can be removed from the mobile cleaning plant at the same point at which the soiled trolleys are fed to the plant. The cleaned and stacked trolleys can, therefore, be collected from the same point at which the soiled trolleys were delivered in a stacked formation for cleaning, so that time-consuming manual pushing of the cleaned trolleys back to the agreed collection point is eliminated.

The configuration of the washing installation is not restricted to the above-mentioned U-shape. Other horizontal transport paths in the washing installation are possible. For example, the washing installation can be so arranged that a trolley can be inserted into the container at one end and conveyed in the container initially parallel to the longitudinal axis of said container; they can then follow a travel section in a direction substantially transverse to the longitudinal axis of the container and finally leave the container on the side opposite to the intake side again on a path parallel to the longitudinal axis.

It is also possible for a washing installation to have more than one travel section disposed transversely to the longitudinal axis of the container. This can be provided, for example, in the form of a kind of serpentine path through of the washing installation.

Once the mobile cleaning plant for shopping trolleys of all kinds is ready for operation, the trolleys, which have previously been automatically separated, are transported into the plant by means of a chain or belt conveyor, air-blasted according to a preset program sequence, cleaned or washed, rinsed, dried and subjected to concluding special treatments (spraying with disinfectant and/or lubricants). The cleaned trolleys are then removed from the cleaning plant by means of the chain or belt conveyor and automatically stacked one behind the other. These processes are repeated until the desired number of trolleys has been cleaned, until the mobile cleaning plant requires maintenance or until the available supply of clean water, cleaning agent, disinfectants and/or lubricants, heating oil, compressed air, etc., has been exhausted and must therefore be replenished.

With regard to the supply of the trolleys to the washing plant and their removal therefrom the invention—depending on the embodiment—can have the features described below.

To receive a row of horizontally stacked shopping trolleys, a conveyor ramp is provided. A spring-loaded stop is located on the floor of the conveyor ramp. Guidance arrangements for the row of trolleys can also the mounted on the conveyor ramp. The stacked trolleys are now pushed manually on to the conveyor ramp and up to the stop.

To fasten the trolleys and transport them onwards, an automatic conveyor shackle device is provided which comprises a shackle, a cable and a linear guidance unit. The conveyor shackle for fixing and transporting the trolleys is first closed. The shackle can engage, for example, directly on the last trolley of the row. The conveyor shackle is driven by means of the cable and the linear guidance unit serves to guide the movement sequence.

The conveyor ramp is then raised at the conveyor end—for example by means of a cable winch—to the level of the washing plant. A guidance arrangement is provided for this raising of the conveyor ramp. The ramp can preferably be provided with rollers at its opposite end to permit compensatory movement of the ramp along the ground.

As soon as the raised end of the conveyor ramp has reached the level of the floor of the washing plant the winch is automatically stopped by means of a limit switch.

The fastening of the stop is then released and by means of the above-described conveyor shackle arrangement the row of trolleys is moved forwards by one trolley—i.e. by one "stacking length". This can also be carried out automatically.

Once the first trolley in the row has been moved past the stop, the stop automatically moves back upright and is again fastened. The first trolley has now been detached from the row and is pulled into the first washing station of the washing plant by means of a long-chain conveyor system. The long-chain conveyor system is, for example, guided by rails and driven by means of toothed belts.

On completion of the washing process, the trolley is initially located in the last washing station. From there, it is automatically moved out by means of a chain system on to the conveyor ramp which is still at the level of the floor of the washing installation.

By means of a second conveyor shackle arrangement which, like the first-mentioned arrangement, comprises a conveyor shackle, a cable and a linear guidance unit, the trolley is captured on the conveyor ramp.

As soon as the trolley is standing fully on the conveyor ramp, it is automatically moved forwards by one "stacking length" by means of the second conveyor shackle arrangement. This makes room for the following trolley which leaves the last washing station on completion of the washing process.

As soon as all the trolleys of the row are located on the conveyor ramp, said ramp is lowered to the ground by means of the above-described winch. A guide is provided for lowering the conveyor ramp. The part of the ramp located on the ground is moved by means of the above-described rollers. Finally, the conveyor shackle is opened and the row of trolleys is pushed manually from the conveyor ramp.

It should be emphasised at this point that the invention is preferably configured in such a way that the above-described sequence—unless explicitly described otherwise—takes place automatically.

As already mentioned, the trolleys can be transported to the mobile cleaning plant stacked one behind the other. They are then automatically separated by a device according to the invention before they are fed to the mobile cleaning plant. The trolleys are removed from said cleaning plant on the same side to which they were fed and are automatically stacked one behind the other. Decisive advantages of this system, among others, are that the mobile cleaning plant can be operated by only one person and that the plant has a far smaller space requirement in comparison to conventional cleaning plants in which shopping trolleys are guided monodirectionally through a rectilinear washing installation. The mobile cleaning plant according to the invention does not need to be uncoupled from the tractor vehicle with which the plant is transported to enable the actions comprising the cleaning process to be carried out. The uncoupling and separation of the shopping trolleys supplied to the mobile cleaning plant in stacked rows, their transportation through the plant and the bringing together of the trolleys after passing through the mobile cleaning plant can be adapted to different sizes and types of shopping trolleys.

Before the wet cleaning process itself, the trolleys are blasted by means of a compressed air jet as part of the dry cleaning process so that light solids can be removed and do not impede the subsequent wet cleaning.

To protect the mobile cleaning plant from the effects of frost, heating arrangements and an automatic temperature monitoring and control system are provided so that breakdown-free operation of the plant even at outside temperatures below freezing point is possible.

The mobile cleaning plant for shopping trolleys according to the invention can be composed, for example, of a total of six stations, in which the following cleaning processes take place successively for each shopping trolley fed to the plant:

Station #1a: Blowing out of light solids and small dirt particles (suggested duration: e.g. 5 seconds per trolley);

Station #1b: Application and effect of chemical cleaning agents (suggested duration: e.g. 25 seconds per trolley);

Station #2: Washing of the trolleys with pressurised water jets from rotating high-pressure nozzles acting on the trolleys from five directions (from the front, the rear, the right, the left and above), whereby it is ensured that complete surface cleaning of the trolleys can be achieved (suggested duration: e.g. 30 seconds per trolley);

Station #3: Cleaning of the trolleys with rotary brushes, automatic watering of the brushes with used water being carried out (suggested duration: e.g. 30 seconds per trolley);

Station #4: Fine rinsing of the trolleys with clean water (suggested duration: e.g. 30 seconds per trolley);

Station #5: Drying of the trolleys by supplying hot air (suggested duration: e.g. 30 seconds per trolley);

Station #6: Final drying of the trolleys by supplying hot air (suggested duration: e.g. 30 seconds per trolley), followed by spraying with chemical disinfectants to kill morbific agents and/or application of lubricants to the wheel axles of the trolleys to reduce frictional resistance between wheels and axles (suggested duration: e.g. 30 seconds per trolley).

To reduce the consumption of clean water during rinsing of the trolleys in station #4, an atomising device which produces a mixture of air and clean water can optionally be used. Furthermore, cleaning and re-use of used water for cleaning the trolleys is provided in the solution according to the invention. For this purpose, the soiled cleaning fluid and the used water are purified in a water treatment plant by means of filters and admixture of chemical and/or biological additives and fed back into the cleaning circuit.

As can be readily understood by an average person skilled in the art, the basic invention is not restricted to the above-described embodiments. In addition to the features disclosed, numerous modifications and variations are possible without deviating materially from the field of. application of the present invention, as disclosed in the claims.

The method according to the invention can be advantageously extended, for example, to the cleaning of vehicles, storage and/or transport containers for merchandise, goods and objects of all kind such as shopping baskets, serving trolleys, beverage boxes, crates, barrels, boilers, tanks, refuse bins and/or containers of all kinds.

BRIEF DESCRIPTION OF THE DRAWINGS

Further advantages and utilities of the basic invention result from the subsidiary dependent claims and from the following description of a preferred embodiment of the invention which is illustrated in the following drawings, in which:

DETAILED DESCRIPTION OF THE INVENTION

The functions of the assemblies contained in a first embodiment of the present invention, as illustrated in FIGS. 1 to 4, are described in more detail below.

Cleaning Stations

In the individual cleaning stations 102, 104, 106, 108, 110, 112 and/or 114 in the preferred embodiment of the basic invention, the following cleaning processes are carried out:

Using an air blasting device in station 102, solid residues, scraps of refuse and/or dirt particles are blown out. The cleaning process in stations 106 and 108 can be reinforced and accelerated by the supply of chemical cleaning agents in combination with high-pressure water and/or rotating, watered brushes. According to the preferred embodiment of the basic invention at least one rinsing process using low-pressure water is carried out in station 110 for the cleaned trolleys in order to remove residues of any chemical cleaning agents supplied. Drying processes using a hot air supply are then carried out for the cleaned trolleys in each of stations 112 and 114, to accelerate the drying of the cleaned trolleys. On completion of the drying process, spraying of chemical disinfectants on the cleaned and dried trolleys can optionally be carried out in order to kill morbific agents. On completion of the last drying process according to the invention, an application of lubricants for the wheel axles of the trolleys can be provided to reduce the frictional resistance between the wheels and axles of the trolleys and thus to increase the service life of the wheels and axles and to keep the noise level caused by movement of the trolleys low.

To reliably avoid detrimental interaction between the individual cleaning, drying, disinfecting and maintenance operations carried out in the separate stations 102, 104, 106, 108, 110, 112 and/or 114, and undesired mixing of used and clean water and of the chemical cleaning agents and/or disinfectants used, isolating partitions 116 can be inserted between the separate stations 102, 104, 106, 108, 110, 112 and/or 114 of the mobile cleaning system 101. In this way, detrimental interaction between the cleaning, drying, disinfecting and maintenance operations carried out in the different stations, and undesired mixing of used water and clean water and of the chemical cleaning agents and/or disinfectants used can be avoided. The partitions 116 are height-adjustable and can be folded aside or rolled up.

The mobile cleaning plant 101 according to the invention also includes an integrated collecting trough 202 for all the stations 102, 104, 106, 108, 110, 112 and/or 114 in which the used water which has been diverted away is collected and directed into a used-water tank 320. Integrated in this collecting trough 202 is a coarse sieve 118 and a monitoring unit which ensures that the air-blasted coarse dirt particles do not enter the used-water tank 320 or block the feed pipes. Arranged after said coarse sieve 118 is a filter unit with exchangeable filter elements to remove fine dirt particles from the used water before the latter reaches the used-water tank 320 to be reused for further cleaning processes.

Feeding, Conveying and Removing the Trolleys

For the ingress 402b and egress 402c of the trolleys, electrically, hydraulically and/or pneumatically driven feed and removal devices can be used, for example, hinged ramps 120 and/or 122, lifting platforms, rising cylinders 304, conveyor belts 204 and/or winches 302.

The temporal coordination and control of the feed and removal of the trolleys and of the work sequences in the individual stations 102, 104, 106, 108, 110, 112 and/or 114 of the mobile cleaning system 101 are carried out according to the preferred embodiment of the basic invention by a central control system which additionally controls the marginal conditions required for cleaning the shopping trolleys.

These marginal conditions can be, for example, the quantity of clean water, lubricants and/or chemical cleaning agents and disinfectants supplied, the quantity of used water removed, and physical parameters such as the temperature and/or pressure of clean water, used water, lubricants and/or chemical cleaning agents and disinfectants and the timing of the supply and removal of these fluids.

Figure 1:
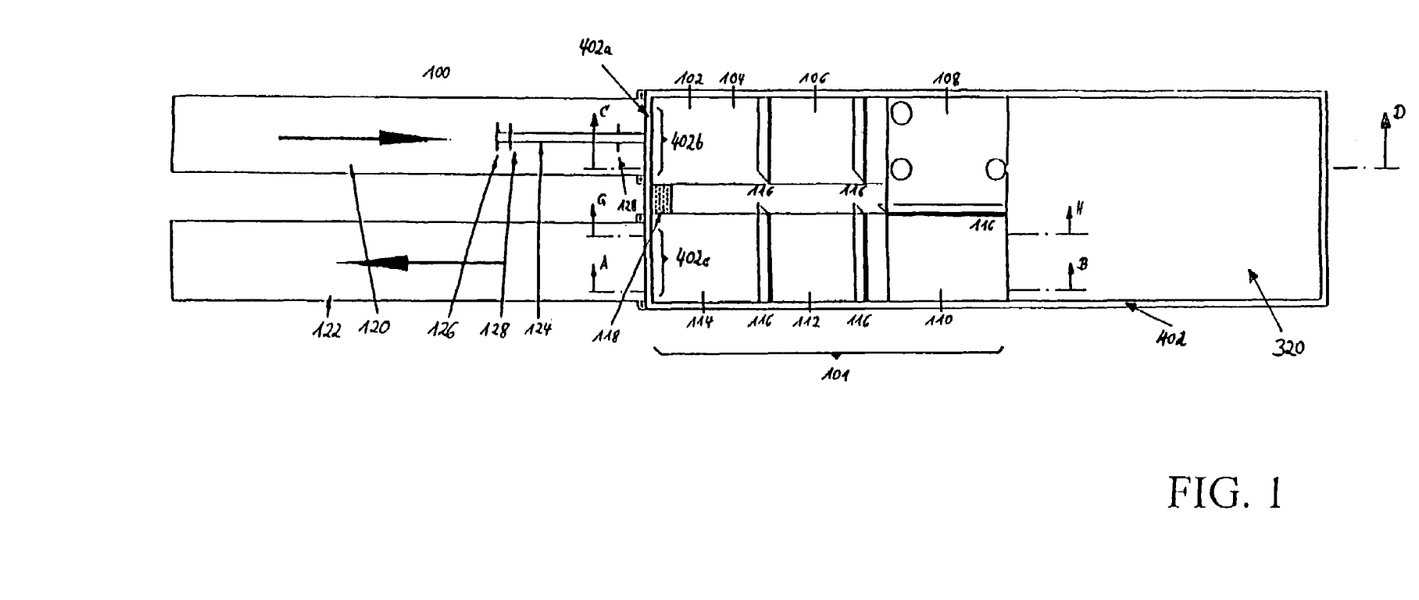
FIG. 1 shows a longitudinal cross-section E-F through the shopping trolley feed system 120, the trolley removal system 122, the container interior 402 and the mobile cleaning plant 101 located therein (view from above)
Figure 2:
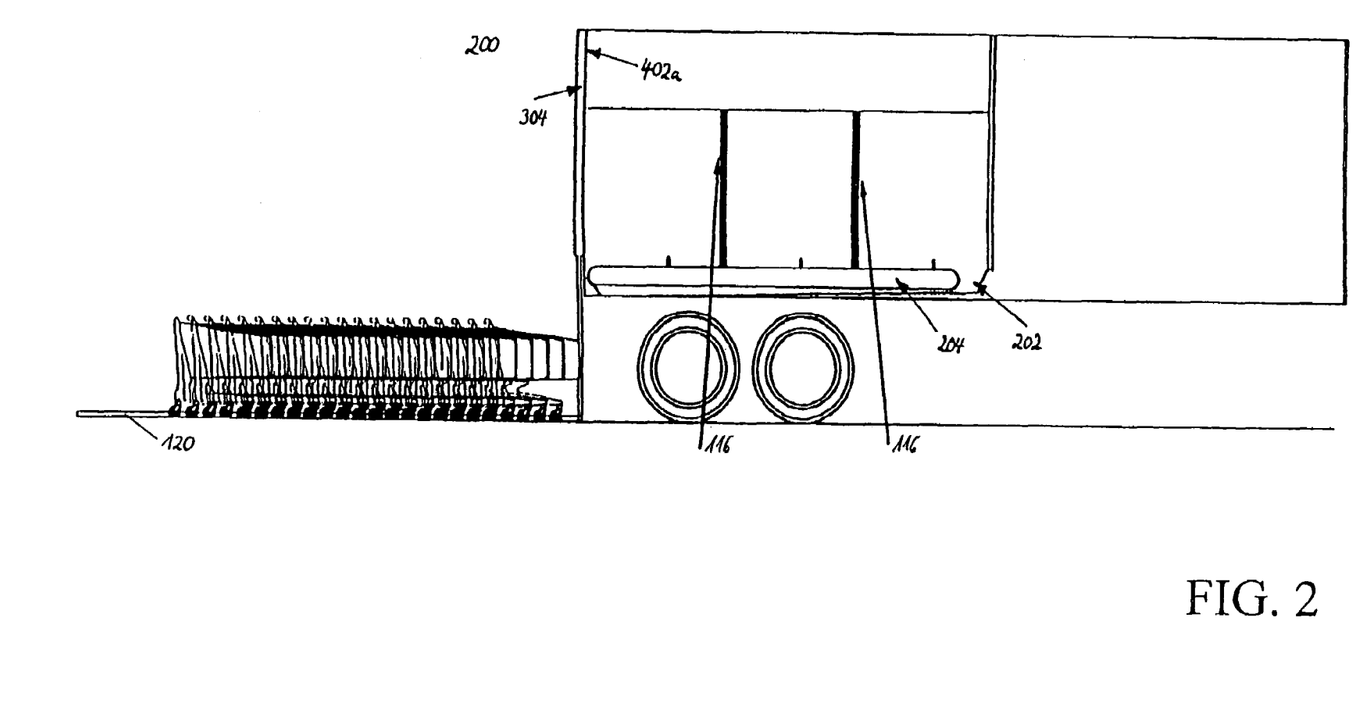
FIG. 2 shows a longitudinal cross-section G-H through the trolley feed system 120 and the container interior 402, the hinged ramps 120 and 122 being in the non-raised state (side view from right)
Figure 3:
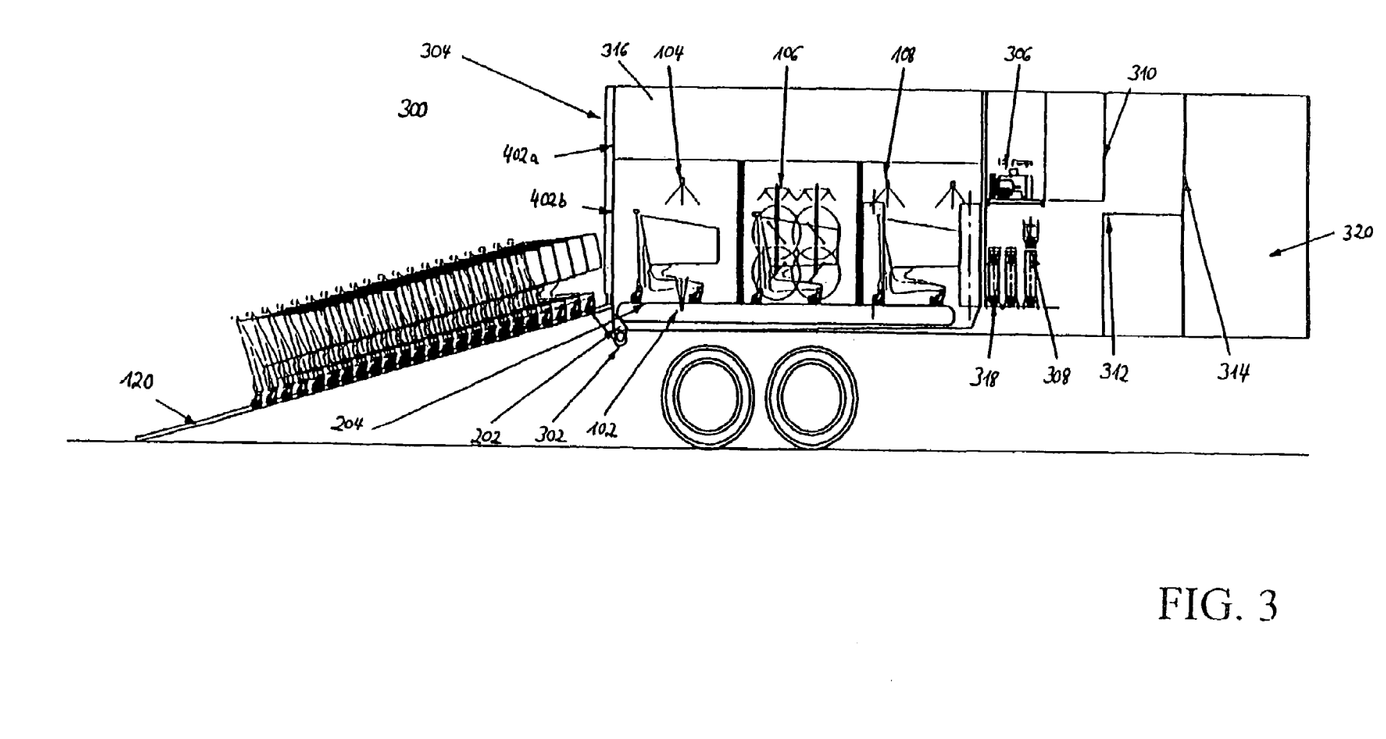
FIG. 3 shows a longitudinal cross-section C-D through the trolley feed system 120, the container interior 402 and the mobile cleaning plant 101 located therein, the hinged ramps 120 and 122 being in the raised state (side view from right)
Figure 4:
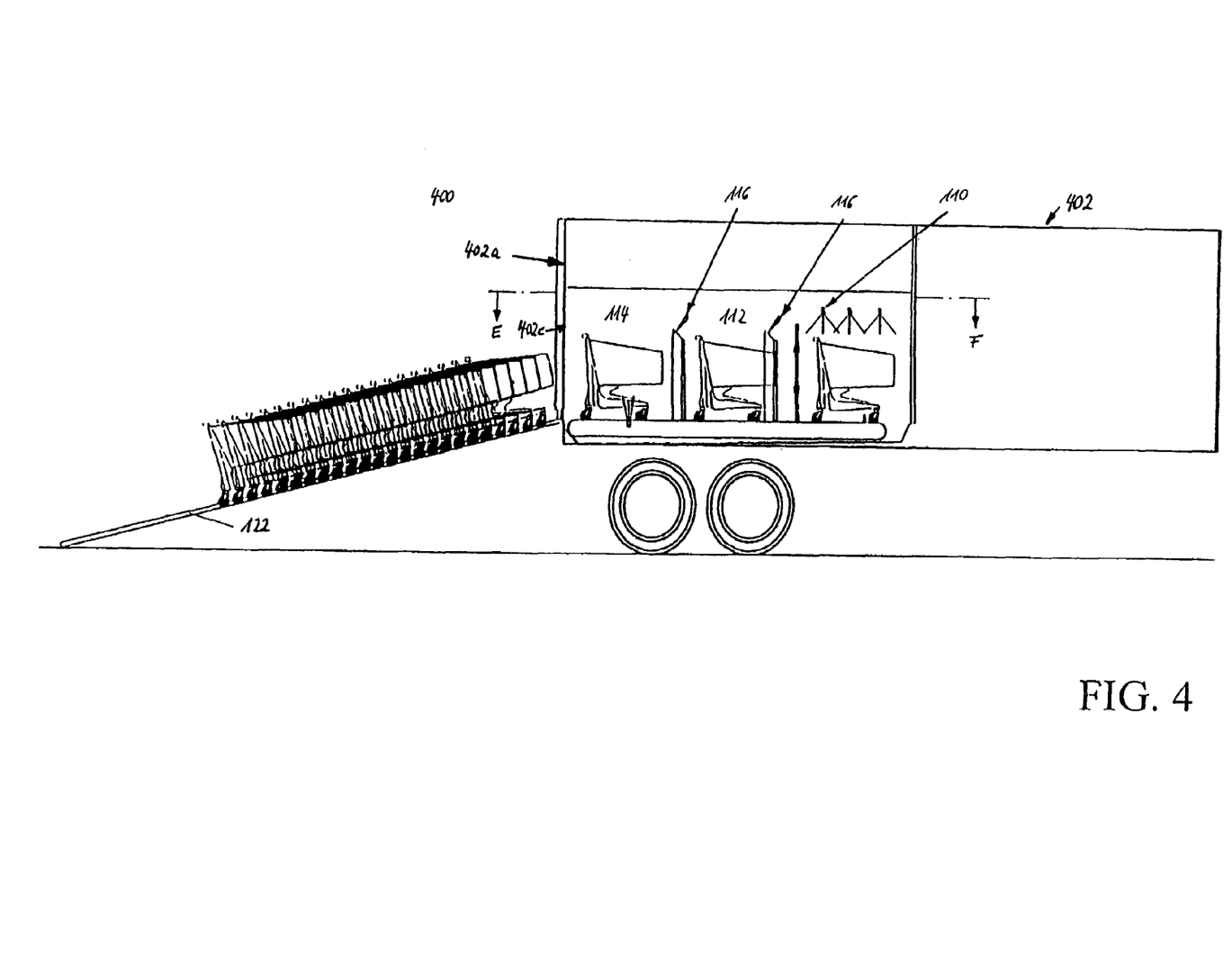
FIG. 4 shows a longitudinal cross-section A-B through the trolley removal system 122, the container interior 402 and the mobile cleaning plant 101 located therein, the hinged ramps 120 and 122 being in the raised state (side view from right).

As can be seen in particular in FIG. 1, it is provided according to the present invention that the intake 402b for admitting the shopping trolleys to be cleaned and the outlet 402c for the cleaned trolleys are arranged on the same side 402a of the container 402. According to the present embodiment, this side is the rear end face of the container. The present invention therefore departs from the known principle of washing installations (in which ingress and egress take place at opposite ends of the washing installation) in that the intake and the outlet are arranged at the same end of the container. This has the advantage that the container 402, in the manner of a semitrailer of a heavy goods vehicle, for example, can remain on the latter and need not be uncoupled, lowered or the like during operation. Moreover, this configuration has the advantage that the rear portion 320 of the container 402 can be used in an economic manner to house units, containers, etc.

As can also be seen in FIG. 1, it is provided according to the present embodiment that the actual "washing installation" includes at least two parallel tracks. This means that at least two stations of the "washing installation" are arranged in a laterally offset manner with respect to each other and to the longitudinal axis of the container 402. As a result, a U-shaped arrangement of the washing installation is produced, the two legs of the "U" representing the tracks in which the washing stations are arranged, and the connecting link of the "U" corresponding to a conveyance of the trolleys or the like transversely to the longitudinal axis of the container 402.

As already stated, according to the inventive mobile cleaning plant 101, the washing installation follows a substantially U-shaped path, so that the intake 402b and the outlet 402c of the washing installation are located at the same end 402a of the container 402. This results in the processing advantage that the cleaned trolleys are removed from the mobile cleaning plant at the same point at which the soiled trolleys are fed to the plant. In addition to the advantageous layout of the container 402, this results in the further advantage that the cleaned and stacked trolleys can be collected from the same point to which the soiled (stacked) trolleys were previously delivered for cleaning. Time-consuming manual pushing of the cleaned trolleys back to a collection point is therefore eliminated.

The container 402 has in its interior a floor-mounted conveyor device 204 which conveys the trolleys in at least one section 102, 104 and/or 106, and 110 and/or 112 substantially parallel to the longitudinal axis of the container 402, and in at least one further section 108 and/or 110 substantially transversely to the longitudinal axis of the container 402. The trolleys are therefore transported in three directions: first, parallel to the longitudinal axis of the container 402 into the latter (from station #1a and #1b to station #3), then transversely to the longitudinal axis of the container 402 (from station #3 to station #4) and finally parallel to the longitudinal axis of the container 402 (from station #4 to station #6) and out of the latter.

For automatic conveyance of the trolleys from the ramp into the washing installation, a long-chain conveyor system is provided. Here, guidance is effected by means of rails and drive by means of toothed belts. Inside the washing installation the automatic conveyance of the trolleys is effected by means of a chain drive.

The trolley is pushed from the second to the third washing station by pneumatic means. From the third to the fourth washing station conveyance takes place transversely to the longitudinal axis of the container, the trolley being gripped at the front by means of two pneumatic parallel grippers and pushed into the fourth washing station by means of a pneumatically driven linear unit. Conveyance from the fourth to the fifth washing station and onwards to the sixth washing station is again carried out by pneumatic means and chain conveyor.

To feed the shopping trolleys to be cleaned to the mobile cleaning plant 101 in the container 402, trolleys in K stacked rows $$R_k = R_{k,1}' := \{STR_{k,1}, \ldots, STR_{k,n}, \ldots, STR_{k,N}\} \text{ (for } 1 \leq k \leq K),$$

each row consisting of N shopping trolleys (N≈20), are pushed manually or mechanically on to a lowered hinged ramp 120 until the front trolley of the row $R_{k,1}'$ ($STR_{k,1}$) touches a retaining cylinder 126 at the end of the hinged ramp 120. Next, the cable of a winch 302, the end of which is provided with a special hook, is hooked on to the last trolley of the row $R_{k,1}'$ ($STR_{k,N}$). Then the hinged ramp 120 is raised by means of the rising cylinder 304. As this happens, the winch 302, which may be arranged above or below the trolleys of the row $R_{k,1}'$, maintains the trolleys in position. After the hinged ramp 120 has been raised, the last N−1 trolleys $STR_{k,2}$ to $STR_{k,N}$ of the row $R_{k,1}'$ are conveyed by means of the winch 302 up to the retaining cylinder 126 at the end of the hinged ramp 120, the first trolley of the row $R_{k,1}'$ ($STR_{k,1}$) being separated from the row $R_{k,1}'$ by means of an automatic separating mechanism consisting of a cylinder 124 for longitudinal conveyance. of the trolleys and slave cylinders 128 mounted transversely to the longitudinal axis of cylinder 124.

After the first trolley ($STR_{k,1}$) has been separated the remaining row will be denoted below by $$R_{k,2}' := \{STR_{k,2}, \ldots, STR_{k,N}\} \subset R_{k,1}' \text{ (for } 1 \leq k \leq K).$$

Once the trolley $STR_{k,1}$ separated from the row $R_{k,1}'$ has been transported into the mobile cleaning plant 101, the winch 302 maintains the trolleys in position or again transports the remaining N−2 trolleys of the row $R_{k,2}'$ ($STR_{k,3}$ to $STR_{k,N}$) up to the retaining cylinder 126 at the end of the hinged ramp 120, the first trolley of the row $R_{k,2}'$ ($STR_{k,2}$) at the same time being separated from the row $R_{k,2}'$ by means of the above-mentioned automatic separation mechanism consisting of the cylinder 124 for longitudinal conveyance of the trolleys and the slave cylinders 128 mounted transversely to the longitudinal axis of the cylinder 124.

The row remaining after the separation of the nth trolley ($STR_{k,n}$) will be denoted in general below as $$R_{k,n+1}' := \{STR_{k,n+1}, \ldots, STR_{k,N}\} \oe R_{k,n}' \oe \ldots \oe R_{k,1}'$$
(for $1 \leq k \leq K$).

For $1 \leq n \leq N-2$ the following steps are then carried out:

Once the trolley $STR_{k,n}$ separated from the row $R_{k,n}'$ has been transported into the mobile cleaning plant 101, the winch 302 maintains the trolleys in position or again transports the remaining N−(n+1) trolleys of the row $R_{k,n+1}'$ ($STR_{k,n+2}$ to $STR_{k,N}$) up to the retaining cylinder 126 at the end of the hinged ramp 120, the first trolley of the row $R_{k,n+1}'$ ($STR_{k,n+1}$) at the same time being separated from the row $R_{k,n+1}'$ by means of the above-mentioned automatic separation mechanism consisting of the cylinder 124 for longitudinal conveyance of the trolleys and the slave cylinders 128 mounted transversely to the longitudinal axis of the cylinder 124.

In the last step after the separation of the (N−1)th trolley ($STR_{k,N-1}$), only the "row"

$$R_{k,N}' := \{STR_{k,N}\} \oe R_{k,N-1}' \ldots \oe \ldots \oe R_{k,1}' \text{ (for } 1 \leq k \leq K)$$

remains behind, consisting of a single trolley ($STR_{k,N}$). This last trolley ($STR_{k,n}$) is then transported by means of the winch 302 into the mobile cleaning plant 101.

Automatic separation of the trolleys fed to the mobile cleaning plant

As was mentioned above, the automatic separating mechanism operates by means of pneumatically or hydraulically actuated retaining cylinders 126 and slave cylinders 128 mounted transversely to the longitudinal axis of a cylinder 124 which is used for longitudinal conveyance of the trolleys. The cylinder 124 has two associated slave cylinders 128 which in each case engage behind the four wheels of a trolley to be transported into the mobile cleaning plant 101. Once the cylinder 124 has reached its stop position after longitudinally conveying a trolley $STR_i$, the front wheels of the trolley $STR_i$ concerned are located on a chain or belt conveyor 204 and are transported further thereon. During actuation of the cylinder 124, the retaining cylinders 126 maintain the next trolley $STR_{i+1}$ in its position so that its predecessor (STRI) can be fed to the mobile cleaning plant 101. Once the trolley $STR_i$ is in the mobile cleaning plant 101 the retaining cylinders 126 release the trolley $STR_{i+1}$ so that it can be moved into the stop position by the winch 302. The chain or belt conveyor 204 is preferably arranged in the floor of the container 402 and equipped with special catch units by means of which the trolleys are moved through the mobile cleaning plant 101. These catch units preferably engage behind the wheels of a trolley.

Energy Supply of the Mobile Cleaning Plant

For the self-sufficient energy supply of all electrically, hydraulically and/or pneumatically driven feed, cleaning and removal devices for the trolleys at least one power generator can be used to ensure that the mobile cleaning plant 101 can be operated independently of external energy sources.

Further Features of Preferred Embodiments of the Solution According to the Invention In the preferred embodiment of the basic invention, the unlocking of the coin-operated locks of the trolleys before feeding the trolleys into the mobile cleaning plant 101, and the locking of the coin-operated locks of the trolleys after removal of the trolleys from the mobile cleaning plant 101 are done manually. The invention can, however, be extended in a simple manner to include an automatic unlocking and locking mechanism.

The solution according to the invention also provides a water treatment plant which purifies the used water produced and captured after each cleaning process by making use of chemical and/or biological additives, so that it can be reused for further cleaning processes. For this purpose, there is provided at least one collecting trough 202, a grating, a coarse sieve 118 and/or a filter with exchangeable filter elements for collecting used water and capturing coarse and/or fine dirt particles located therein to ensure that cleaned used water can be reused to clean trolleys after being conducted back into the mobile cleaning plant 101.

To protect the mobile cleaning plant 101 from the effects of frost, a heating device with temperature monitoring can additionally be provided.

In addition, the mobile cleaning plant 101 in the preferred embodiment of the basic invention also includes
  numerous pumps for supplying and removing clean and used water, cleaning agents, disinfectants and lubricants;
  numerous valves serving to prevent backflow, as blocking devices and/or pressure-reducing devices;
  filters for cleaning the soiled used water;
  pipework for the supply and removal of clean and used water, cleaning agents, disinfectants and lubricants;
  containers or tanks for storing fresh and used water, cleaning agents, disinfectants, lubricants and heating oil;
  measuring instruments to measure liquid levels, temperature and pressure;
  a device for regulating the operating temperature;
  a blower device for blowing out fine dirt particles;

a blower device for supplying hot air for the drying processes, and a water treatment plant for purification of the soiled used water, which are not represented in the Figures for reasons of clarity.

The meanings of the symbols in FIGS. 1 to 4 which are provided with reference numerals can be found in the attached list of reference numerals.

List of Reference Numerals

| No. | Symbol |
|---|---|
| 100 | Longitudinal cross-section E-F through the shopping trolley feed system, the trolley removal system, the container interior and the mobile cleaning plant located therein (view from above) |
| 101 | Mobile cleaning plant consisting of a total of six cleaning stations |
| 102 | Station #1a: blowing out of light solids and small dirt particles (suggested duration: e.g. 5 seconds per trolley) |
| 104 | Station #1b: application and effect of chemical cleaning agents (suggested duration: e.g. 25 seconds per trolley) |
| 106 | Station #2: washing of the trolleys with pressurised water jets from rotating high-pressure nozzles acting on the trolleys from five directions (from the front, the rear, the right, the left and above), whereby it is ensured that complete surface cleaning of the trolleys can be achieved (suggested duration: e.g. 30 seconds per trolley) |
| 108 | Station #3: cleaning of the trolleys with rotary brushes, automatic watering of the brushes with used water being carried out (suggested duration: e.g. 30 seconds per trolley) |
| 110 | Station #4: fine rinsing of the trolleys with clean water (suggested duration: e.g. 30 seconds per trolley) |
| 112 | Station #5: drying of the trolleys by supplying hot air (suggested duration: e.g. 30 seconds per trolley) |
| 114 | Station #6: final drying of the trolleys by supplying hot air, followed by spraying with chemical disinfectants to kill morbific agents and/or application of lubricants to the wheel axles of the trolleys to reduce frictional resistance between wheels and axles (suggested duration: e.g. 30 seconds per trolley for each operation) |
| 116 | Partition between the different stations |
| 118 | Coarse sieve with monitoring unit for retaining blown out solid dirt particles |
| 120 | Hinged ramp for feeding the trolleys into the mobile cleaning plant before start of cleaning |
| 122 | Hinged ramp for removing trolleys from the mobile cleaning plant and stacking trolleys on completion of cleaning |
| 124 | Cylinder for longitudinal conveyance of the trolleys to the chain or belt conveyor 204 |
| 126 | Retaining cylinder mounted transversely to the longitudinal axis of cylinder 124 and serving as the stop point for separating the front trolley from trolleys fed to the mobile cleaning plant in stacked rows |
| 128 | Slave cylinder mounted transversely to the longitudinal axis of cylinder 124 which engages behind the front wheels of a trolley separated from its row and detaches the trolley from the row through the longitudinal motion of cylinder 124 |
| 200 | Longitudinal cross-section G-H through the trolley feed system and the container interior, the hinged ramps 120 and 122 being in the non-raised state (side view from right) |
| 202 | Trough for collecting used water and conducting same to a used-water tank |
| 204 | Chain or belt conveyor in the floor of the container, equipped with special catch units by means of which the trolleys are conveyed through the mobile cleaning plant |
| 300 | Longitudinal cross-section C-D through the trolley feed system, the container interior and the mobile cleaning plant located therein, the hinged ramps 120 and 122 being in the raised state (side view from right) |
| 302 | Winch for retaining and conveying further the trolleys for automatic feeding of same into the mobile cleaning plant |
| 304 | Rising cylinder for feeding the trolleys into the mobile cleaning plant |
| 306 | High-pressure pump |
| 308 | Low-pressure pump |
| 310 | Control unit for coordinating the time sequences of the cleaning processes and for regulating physical parameters (temperature, pressure) |
| 312 | Generator for autonomous power supply for all units used |
| 314 | Combined storage tank for clean water and used water |
| 316 | Tanks for clean and used water, cleaning agent, disinfectants, lubricants and heating oil |
| 318 | Filter unit with exchangeable filter elements for removing fine dirt particles from the used water |
| 320 | Liquid tank with separating membrane for two different liquid media |
| 400 | Longitudinal cross-section A-B through the trolley removal system, the container interior and the mobile cleaning plant located therein, the hinged ramps 120 and 122 being in the raised state (side view from right) |
| 402 | Semitrailer or container as housing for the mobile cleaning plant into which the trolleys to be cleaned are introduced and from which they are removed in the cleaned state |
| 402a | Rear end of the semitrailer or container 402 |
| 402b | Intake for feeding the trolleys to be cleaned into the mobile cleaning plant |
| 402c | Outlet for removing the cleaned trolleys from the mobile cleaning plant |

The invention claimed is:

1. A mobile cleaning system for shopping trolleys and transport devices, comprising:

a container into which the shopping trolleys to be cleaned are introduced and from which they are removed in a cleaned state, wherein devices for cleaning the shopping trolleys being provided in the container, wherein the container comprises a conveyor device for the shopping trolleys, including two tracks which run substantially parallel to a longitudinal axis of the container, wherein the two tracks are joined by a third linear track for a lateral offset of the shopping trolleys, and the third linear track runs substantially transversely to the longitudinal axis, and wherein the trolleys are introduced into and removed from the container in substantially the same orientation by means of said two tracks which run substantially parallel to the longitudinal axis of the container.

2. A mobile cleaning system according to claim 1, wherein the conveyor device is incorporated in a floor.

3. A mobile cleaning system according to claim 1, wherein in at least one section, the conveyor device conveys the shopping trolleys into the container substantially parallel to the longitudinal axis of the container and in at least one further section conveys them out of the container substantially parallel to the longitudinal axis of the container.

4. A mobile cleaning system according to claim 1, wherein an intake for introducing the shopping trolleys to be cleaned and an outlet for the shopping trolleys in a cleaned state are arranged on a same side of the container.

5. A mobile cleaning system according to claim 1, wherein an intake and an outlet are formed by a connected opening in the container.

6. A mobile cleaning system according to claim 1, wherein the container has substantially a form of a parallelepiped and both an intake and an outlet for the shopping trolleys are arranged at one end face of the container.

7. A mobile cleaning system according to claim 1, wherein a liquid tank with a separating membrane for two different liquid media is provided in the container in an area remote from an intake and an outlet.

8. A mobile cleaning system according to claim 1, wherein at least two spatially separated stations are provided in the container in which the shopping trolleys are treated for a set duration.

9. A mobile cleaning system according to claim 8, wherein isolating partitions which are height-adjustable and can be folded aside or rolled up are inserted between the spatially separated stations of the mobile cleaning system.

10. A mobile cleaning system according to claim 8, wherein a central regulation and control system is provided for temporal coordination and control of a feeding and a removal of the shopping trolleys and of at least one work sequence in the spatially separated stations of the mobile cleaning system.

11. A mobile cleaning system according to claim 1, further comprising an electrically, hydraulically or pneumatically driven device, provided for intake and outlet of the shopping trolleys, wherein the driven device comprises a hinged ramp, a lifting platform, a rising cylinder, a conveyor belt, or a winch.

12. A mobile cleaning system according to claim 1, wherein in addition to shopping trolleys, vehicles, storage, and transport containers for merchandise, goods and objects of all kinds, such as shopping baskets, serving trolleys, beverage boxes, crates, barrels, boilers, tanks, refuse bins and containers of all kinds that can be cleaned.

13. A method for cleaning shopping trolleys whereby the shopping trolleys are introduced into a container, cleaned, and removed therefrom after being cleaned, devices for cleaning the shopping trolleys being provided in the container, wherein the shopping trolleys are conveyed into the container in two sections arranged substantially parallel to a longitudinal axis of the container and in a further linear section are arranged substantially transverse to the longitudinal axis of the container, and wherein the trolleys are introduced into and removed from the container in substantially the same orientation by means of two tracks which run substantially parallel to the longitudinal axis of the container.

14. A method according to claim 13, wherein the shopping trolleys are conveyed by means of a conveyor device incorporated in a floor.

15. A method according to claim 13, wherein in at least one further section the shopping trolleys are conveyed into the container substantially parallel to the longitudinal axis of the container and in at least one third section are conveyed out of the container substantially parallel to the longitudinal axis of the container.

16. A method according to claim 13, wherein a feeding in of the shopping trolleys to be cleaned and a removal of cleaned shopping trolleys in a cleaned state take place at a same side of the container.

17. A method according to claim 13, wherein a feeding in and removal of the shopping trolleys are effected by means of a connected opening in the container.

18. A method according to claim 13, wherein the container has substantially a form of a parallelepiped and both a feeding in and a removal of the shopping trolleys take place at a same end face of the container.

19. A method according to claim 13, wherein the shopping trolleys are treated in the container for a set duration in at least two spatially separate stations.

\* \* \* \* \*